United States Patent Office 3,527,379
Patented Sept. 8, 1970

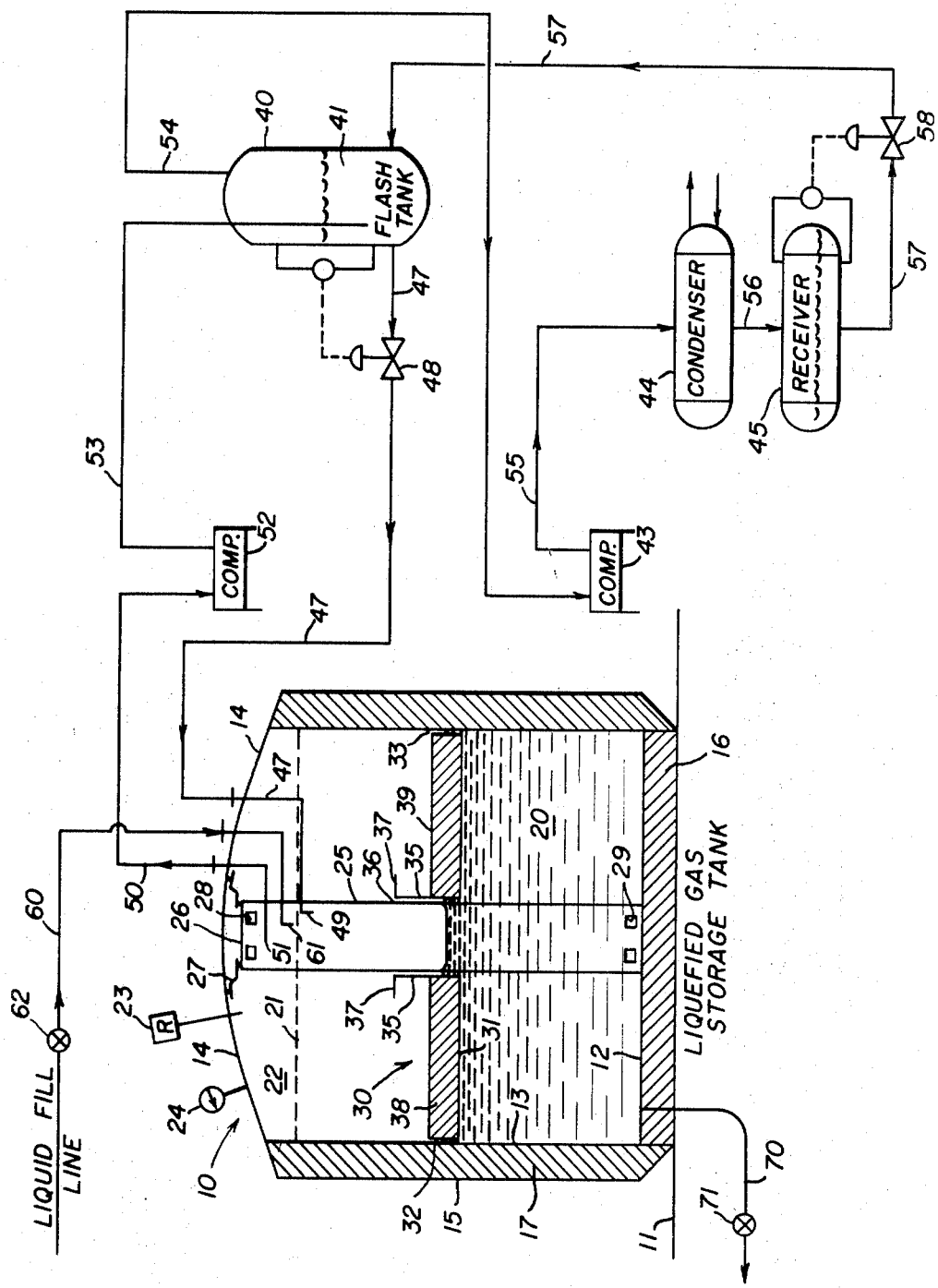

3,527,379
SYSTEMS AND TANKS THEREFOR FOR STORING PRODUCTS IN THE LIQUID PHASE THAT ARE NORMALLY IN THE GAS PHASE
James Mair, Chicago, Ill., assignor to General American Transportation Corporation, Chicago, Ill., a corporation of New York
Filed May 9, 1968, Ser. No. 727,813
Int. Cl. B65d 25/00; F17c 1/00
U.S. Cl. 220—85                              19 Claims

ABSTRACT OF THE DISCLOSURE

There is disclosed a system for storing in the liquid phase a product that is entirely in the gas phase under atmospheric pressure and ambient temperature conditions, including an upstanding storage tank that is hermetically sealed and is heat-insulated on the bottom wall and side wall thereof, an upstanding tube centrally of the tank guiding a floating roof that is heat-insulated and is adapted to float upon the liquefied product, and auxiliary equipment outside the tank for removing vapors therefrom and returning liquefied product thereto so as to maintain the atmospheric pressure while cooling the contents of the tank.

---

The present invention relates to systems for storing in the liquid phase products that are characterized by being entirely in the gas phase under atmospheric pressure and ambient temperature conditions, and to a storage tank useful to such systems.

It is an important object of the present invention to provide a system of the type set forth including a storage tank having a bottom wall and an upstanding side wall and a top wall, the bottom wall and the side wall being heat-insulated, a floating roof disposed in the tank and adapted to float upon a body of the product in the liquid phase and cooperating with the top wall to define a chamber therebetween, the floating roof including a generally horizontal deck with a fender on the outer periphery thereof and a quantity of heat-insulating material mounted thereon, a flash tank, means for withdrawing from the chamber the gaseous product and for compressing the same to deliver to the flash tank product at relatively high temperature and high pressure conditions, and means for supplying to the storage tank condensate from the flash tank under relatively high pressure and high temperature conditions.

In connection with the foregoing object, it is another object to provide in a system of the type set forth guide structure mounted in the storage tank and extending upwardly through the floating roof, and an annular guide mounted on the deck adjacent to the guide structure for cooperation therewith to stabilize the movements of the floating roof within the storage tank.

Another object of the invention is to provide a storage system of the type set forth, wherein the upstanding tube mounted centrally in the storage tank has upper passages therein adjacent to the upper end thereof, the passages providing communication between the interior of the tube and the storage tank, the inlet into the storage tank for returning liquefied product communicating with the interior of the tube adjacent to the upper end thereof.

Another object of the invention is to provide a storage system of the type set forth incorporating the upstanding tube therein, wherein the liquefied product fill connection to the storage tank and the returned liquefied product connection to the storage tank both communicate with and terminate in the upper portion of the tube, and the outlet for gaseous product from the storage tank is also from the interior of the tube adjacent to the upper end thereof and at a point above the inlets for liquefied product.

A further object of the invention is to provide an improved storage tank for use in the novel storage systems of the present invention.

Further features of the invention pertain to the particular arrangement of the elements of the storage system and of the elements of the storage tank incorporated therein, whereby the above-outlined and additional operating features thereof are attained.

The invention, both as to its organization and method of operation, together with further objects and advantages thereof, will best be understood by reference to the following specification, taken in connection with the accompanying drawing, in which:

There is shown in the single figure thereof a diagrammatic illustration of a system for storing products in the liquid phase that are in the gas phase under atmospheric pressure and ambient temperature conditions, and incorporating a field storage tank, which storage system and storage tank are made in accordance and embody the principles of the present invention.

Referring to the drawings, the storage system there illustrated, and embodying the features of the present invention, is specifically adapted for use in the storage of anhydrous liquid ammonia, an important element of the storage system being a field storage tank 10 of large volume. As illustrated, the field storage tank 10 is mounted upon the upper surface of the ground illustrated at 11, but it will be understood that the principles of the invention are equally applicable when the storage tank 10 is either partly or completely buried within the ground 11. The storage tank 10 more particularly includes an inner bottom wall 12 that is generally circular in outline, and an upstanding substantially cylindrical inner side wall 13, and a convex substantially dome-shaped top wall 14. The walls 12, 13 and 14 are ordinarily formed of steel, and the tank 10 is fluid-tight and hermetically sealed by reason of the formation of the proper joints between the walls 12, 13 and 14, which joints may preferably be made as by welding.

There is provided about and completely covering the bottom wall 12 and the side wall 13 bodies 16 and 17, respectively of heat-insulating material, which bodies may be formed of conventional materials in the usual manner. In one form of the invention, the layers or bodies 16 and 17 of heat-insulating material are exposed to the elements of weather, whereby the material for forming the layers 16 and 17 must be highly resistant to the elements of weather. However, in the form of the invention illustrated, an outer metal side wall 15 is provided so as to protect the layer 17 of heat-insulating material from the elements. Further, it is pointed out that in certain installations the layer 16 of heat-insulating material may be omitted and the bottom wall 12 of the storage tank 10 directly supported upon an earth foundation, because normally a heater is arranged in the foundation and adapted to supply heat into the bottom wall 12 to prevent freezing of the subsoil and subsequent heaving of the soil because of ice formation.

The storage tank 10 is adapted to contain a body of anhydrous liquid ammonia indicated at 20, the maximum level of which is indicated at 21, which level 21 is well below the top wall 14 so as always to provide a chamber 22 immediately below the top wall 14. Also, the storage tank 10 is provided with the usual instrumentation, including a pressure relief valve 23 and a pressure gauge 24, both communicating with the chamber 22. Also, an upstanding tube 25 is arranged generally in the central portion of the storage tank 10 and is provided with a wall 26 closing the upper end thereof, the lower end thereof being closed by the bottom wall 12. The upper end of the tube 25 is anchored by structure 27 to the top wall 14, whereas the lower end of the tube 25 is directly anchored on the bottom wall 12. A plurality of upper passages 28 are formed through the side walls of the tube 25 adjacent to the upper end thereof, the passages 28 providing communication between the interior of the tube 25 and the chamber 22. The passages 28 also are preferably equidistantly arranged around the perimeter of the tube 25 and extend laterally therethrough. A like plurality of lower passages 29 are formed through the side walls of the tube 25 adjacent to the lower end thereof, the passages 29 providing communication between the interior of the tube 25 and the body of stored product 20. The passages 29 also are preferably arranged equidistantly around the perimeter of the tube 25 and extend laterally therethrough.

Disposed within the storage tank 10 and floating upon the liquefied product 20 is a floating roof, generally designated by the numeral 30. The floating roof 30 includes a generally annular deck 31 that is horizontally arranged and substantially fills the annular space between the side wall 13 and the tube 25. Mounted on the outer edge of the deck 31 is a vertically upstanding fender 32 annular in shape and disposed adjacent to the side wall 13 but spaced inwardly therefrom to provide a passage 33 therebetween for movement of gaseous product from beneath the floating roof 30 and into the space of the chamber 22. An upstanding annular guide 35 is mounted on the deck 31 adjacent to the tube 25 but spaced a short distance therefrom to provide therebetween a passage 36 through which gaseous product may move from beneath the floating roof 30 into the chamber 22. The upper end of the guide 35 carries an outwardly directed flange 37 thereon which assists in preventing liquefied product from falling onto the upper surface of the floating roof 30. There is also provided on the deck 31 a quantity of heat-insulating material 38 which may be of the same character as that in the heat-insulating layers 16 and 17 directed above. Finally, a cover 39 is provided overlying the heat-insulating material 38 and protecting the same from exposure to the contents of the storage tank 10.

In a typical installation, the deck 31, the fender 32, the guide member 35 and the cover 39 are all formed of steel as is the tube 25 extending upwardly through the center of the floating roof 30.

The storage system further comprises an upstanding flash tank 40 that is adapted to contain a body of anhydrous liquid ammonia, indicated at 41, a main compressor 43, a condenser 44 and a receiver 45. The bottom of the flash tank 40 is connected to a pipe 47 that contains an expansion valve 48, which pipe 47 extends through the top wall 14 of the storage tank 10 and then extends inwardly through the side wall of the tube 25 and terminates in an open end 49 disposed below the upper end of the tube 25 and facing downwardly therein. The interior of the tube 25 above the open pipe end 49 is connected to a pipe 50 having an open end 51 disposed within the tube 25 and positioned above the open end 49, the pipe 50 being connected to the inlet of a booster compressor 52; the outlet of the booster compressor is conected by a pipe 53 to the flash tank 40, the pipe 53 extending downwardly thereinto and terminating adjacent to the bottom thereof. The top of the flash tank 40 is also connected by a pipe 54 to the inlet of the main compressor 43; the outlet of the main compressor 43 is connected by a pipe 55 to the inlet of the condenser 44 that may be of any suitable type; and the outlet of the condenser 44 is connected by a pipe 56 to the inlet of the receiver 45. The outlet of the receiver 45 is connected by a pipe 57 containing an expansion valve 58 to the bottom of the flash tank 40. As indicated, the valves 48 and 58 are both preferably automatically operated in accordance with the level of liquid in the flash tank 40 and the receiver 45, respectively.

The storage system further comprises a liquid fill line 60 that extends through the top wall 14 and inwardly through the side of the tube 25 and discharges as at 61 at a point in elevation intermediate the discharge 49 and the inlet 51, a control valve 62 being provided in the fill line 60. The bottom of the storage tank 10 communicates with an outlet pipe 70 which may be connected to any suitable destination such as a railway tank car filling station, the pipe 70 having a control valve 71 therein.

Considering now the mode of operation of the storage system, it may be assumed that the bodies 20 and 41 of anhydrous liquid ammonia are respectively contained in the tanks 10 and 40, and that additional anhydrous ammonia is available in the liquid fill line 60. As heat leaks into the storage tank 10, some of the liquid ammonia is evaporated from the contained liquefied body 20 and resulting gaseous ammonia rises through the passages 33 and 36 past the floating roof 30 and into the chamber 22 that is defined between the top wall 14 and the upper surface of the floating roof 30. The operating booster compressor 52 withdraws the gaseous ammonia from the chamber 22 via the pipe 50, so as to maintain a relatively low pressure of the gaseous ammonia in the chamber 22. More specifically, the gaseous ammonia is withdrawn from the chamber 22 through the upper passages 28 and into the interior of the tube 25, after which the gaseous ammonia flows into the inlet 51 to the pipe 50. By withdrawing the gaseous ammonia in this manner, a minimum circulation of the gaseous ammonia in the chamber 22 is realized, thus to provide a substantially static body of gaseous ammonia in the chamber 22, which static body of gaseous ammonia serves as a good heat insulation between the floating roof 30 and the top wall 10, i.e., the quiescent volume of gaseous ammonia between the floating roof 30 and the top wall 14 has excellent insulating properties.

The compressed gaseous ammonia from the booster compressor 52 is discharged therefrom via the pipe 53 into the body 41 of the liquid ammonia contained in the flask tank 40, so as to effect cooling thereof and the subsequent liquefaction of the cooled compressed ammonia in the flash tank 40. In turn, liquid ammonia from the body 41 contained in the flash tank 40 is supplied via the pipe 47 and through the expansion valve 48 and the outlet 49 into the interior of the tube 25. This liquid ammonia is relatively warm and under relatively high pressure, whereby a first portion thereof immediately flashes within the tube 25 into gaseous ammonia that rises in the tube 25 and exits through the passages 28 into the chamber 22. This flashing of the first mentioned potrion of the supplied liquid ammonia effects cooling of a second portion thereof; whereby the second mentioned portion of the supplied ammonia falls in liquid form downwardly through the tube 25 and into the contained body 20, thus to add to the volume of the body 20. Any increase in the volume of the body 20 will cause the floating roof 30 to rise a corresponding distance while maintaining the position of the floating roof 30 on top of the surface of the body 20. More specifically, as the height of the column of liquefied ammonia in the tube 25 rises, a portion thereof will flow through the lower passages 29 and into the main body 20, thus to raise the floating roof 30 and to equalize the level of the liquefied ammonia in the main body 20 and in the tube 25. The addition of the re-liquefied ammonia to the body 20 via the tube 25 and the lower passages 29 prevents any of the liquid ammonia from falling upon the upper surface of the floating roof 30, whereby it will be appreciated that handling all gaseous ammonia and liquid ammonia in the tube 25 not only avoids the formation of currents or turbulence in the vapor between the floating roof 30 and the top wall 14, but also confines the liquid ammonia to a position below the floating roof 30, i.e., prevents any inadvertent spilling or splashing of liquid ammonia onto the top of the floating roof 30. In other words, a liquid-vapor separation is achieved in the tube 25 and thus to avoid wetting or flooding the insulated floating roof 30.

The re-saturation of the compressed gaseous ammonia in the body 41 of liquid ammonia contained in the flash tank 40 causes evaporation of gaseous ammonia therefrom, whereby the gaseous ammonia rises into the top of the flash tank 40 and is withdrawn via the pipe 54 into the main compressor 43. The compressed gaseous ammonia is delivered from the main compressor 43 via the pipe 55 into the condenser 44, wherein heat is extracted therefrom so as to effect condensation and liquefaction thereof in a well-known manner. The hot liquid ammonia passes from the condenser 44 via the pipe 56 and into the receiver 45, and thence via the passage 57 and the expansion valve 58 into the lower portion of the flash tank 40. Of course, a part of the liquid ammonia thus supplied into the lower portion of the flash tank 40 is flashed to produce gaseous ammonia that rises into the top of the flash tank 40. Another part of the liquid ammonia thus supplied into the lower portion of the flash tank 40 is cooled by the above-mentioned flashing, whereby the same remains in the body 41 contained in the flash tank 40 so as to replenish the body 41 of liquid ammonia contained in the flash tank 40.

Liquefied ammonia is delivered from the storage tank 10 through the outlet pipe 70 under the control of the valve 71 therein. After the withdrawal of a substantial quantity of liquefied ammonia from the storage tank 10 via the outlet pipe 70, it will be desirable to add additional liquefied ammonia to the storage tank 10 via the liquid fill line 60 by operation of the control valve 62 therein. More specifically, the operator opens the valve 62 thus to admit liquefied ammonia into the pipe 60 which causes discharge thereof through the outlet 61 within the tube 25. The ammonia issuing from the inlet 61 is normally at a temperature higher than that of the liquid in the tank 10, and accordingly a portion thereof flashes to produce gaseous ammonia which flows outwardly through the upper passages 28 into the chamber 22, while the remainder of the added liquid ammonia remains in the liquid state and is cooled to the temperature within the storage tank 10 and thus falls downwardly through the tube 25 thus to raise the level of liquid ammonia therein. As a consequence, liquid ammonia will flow outwardly from the tube 25 through the lower passages 29 and into the main body 20 of liquid ammonia below the floating roof 30. As the level of the main body 20 rises, the floating roof 30 will rise therewith.

In a constructional example of the system, the inner side wall 13 of the storage tank 10 may have an internal diameter of 60 feet and a height of about 60 feet, whereby the maximum level 21 of the body 20 of the liquid ammonia contained in the tank may correspond to about 50 feet. The tube 25 may have an internal diameter of 10 feet.

The booster compressor 52 may maintain a gauge pressure of about 0.5 p.s.i. in the chamber 22, this establishing a temperature of about —28° F. in the liquefied ammonia. Vapor is evolved from the liquefied ammonia due to heat leakage through the insulation, flashing of the liquid fill stream, displacement of vapor by liquid fill, and flashing of liquid returned from the flash tank 40. This ammonia vapor is withdrawn from the chamber 22 by the compressor 52 and compressed to 55 p.s.i. absolute, and then re-saturated by bubbling through liquid ammonia in the flash tank 40, the liquid ammonia in the flash tank 40 being at a temperature of about 26° F. The ammonia vapor from the flash tank 40 is compressed by the compressor 43 to 181 p.s.i. absolute, is then condensed to liquid ammonia by 75° water flowing through the tubes of the condenser 44. More specifically, the receiver 45 contains liquid ammonia at a temperature of about 90° F. which is returned via the pipe 57 and the expansion valve 58 to the flash tank 40 where it is cooled by flashing to a temperature of 26° F. in the flash tank 40.

In view of the foregoing description, it will be understood that substantial economies in the energy required to store liquefied ammonia are realized utilizing the system of the present invention as compared with prior systems. More specifically, the floating roof 30 serves to hold the liquefied ammonia in the body 20 in a quiescent state under a modest pressure on the surface thereof, while permitting gentle and controlled escape of evolved ammonia vapor therefrom through the restricted passages 33 and 36 around the outer and inner peripheries thereof, respectively. The floating roof 30 also tends to hold the ammonia vapor in the chamber 22 in a quiescent and non-turbulent condition, whereby the ammonia vapor in the chamber 22 serves as a heat-insulating layer between the upper surface of the liquid ammonia body 20 and the floating roof 30 on one hand and the top wall 14 on the other hand. The provision of the tube 25 also helps to render the body 20 of liquefied ammonia non-turbulent and also to render the ammonia vapor within the chamber 22 non-turbulent. More specifically, the withdrawal of ammonia vapors into the compressor 52 via the pipe 50 is from the upper end of the chamber 22 and specifically through the upper passages 28 in the tube 25, thereby to prove a smooth and gentle flow of ammonia vapors from the chamber 22. The addition of liquid ammonia via the outlets 49 and 61 is well below the vapor outlet 51, thus to avoid entrainment of liquid ammonia in the vapor going to the compressor 52. The tube 25 also serves the important function of effecting a liquid-vapor separation within the upper portion of the tube 25, all without disturbing or causing turbulence in either the body 20 of liquid ammonia 13 or the body of gaseous ammonia within the chamber 22. Additionally this method of adding liquid ammonia to the storage tank 10 entirely avoids spilling of fluids on the floating roof 30. Finally, it is pointed out that the gaseous ammonia within the chamber 22 is superheated and thus aids in preventing a heat leak into the body 20 of liquefied ammonia.

As has been pointed out above, a part or all of the storage tank 10 may be positioned below the ground level 11 in which case the earth itself may serve as insulation provided that suitable steps are taken to guard against freezing of the ground to cause buckling thereof.

Although important advantages are obtained if the vapor return inlet 51 is disposed within the tube 25, the inlet 51 might also be disposed merely below the top wall 14 in a position exterior with respect to the tube 25. It is also pointed out that the cylindrical guide 35 rides upon the tube 25 so as to guide the movements of the floating roof 30 upwardly and downwardly within the storage tank 10. Of course, in the event of undue pressure of the gaseous ammonia in the chamber 22, the relief valve 23 is opened automatically so as to relieve the high pressure condition in order to prevent damage to the storage tank 10, all in a conventional manner.

While the present storage system has been described in detail in conjunction with the storage of anhydrous liquid ammonia, it will be understood that the same may be utilized to store a wide variety of products that are characterized by being in the gas phase under atmospheric pressure and ambient temperature conditions. Such products that are normally stored in the liquid phase under relatively low temperature conditions include liquid nitrogen, liquid oxygen, liquid hydrogen, liquid air, etc.; whereby these products may be readily stored in the present storage tank although the temperature and pressure ranges involved in such storage are substantially different from those explained above in conjunction with the storage of anhydrous liquid ammonia, as is well understood in cryogenics.

In view of the foregoing, it is apparent that there has been provided in a system for storing products in the liquid phase that are in the gas phase under atmospheric pressure and ambient temperature conditions, a storage tank of improved construction which is substantially more economical in the storage of such products.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. A system for storing in the liquid phase a product that is characterized by being entirely in the gas phase under atmospheric pressure and ambient temperature conditions, said system comprising an upstanding storage tank adapted to contain a body of the product in the liquid phase under substantially atmospheric pressure and relatively low temperature conditions, said storage tank including a bottom wall and an upstanding side wall and a top wall, said bottom wall closing the lower end of said side wall and said top wall closing the upper end of said side wall to form a hermetically sealed storage tank, said bottom wall and said side wall being heat-insulated, a floating roof disposed in said storage tank and adapted to float upon a body of the product in the liquid phase and cooperating with said top wall to define a chamber therebetween, said floating roof including an annular deck arranged horizontally within said tank side wall, a quantity of heat-insulating material mounted on said deck to provide insulation between the lower side of said floating roof and the upper side thereof, a flash tank, means including a gas outlet for withdrawing from said chamber the gaseous product evolved from the contained body of liquefied product and for compressing said gaseous product and for delivering said product to said flash tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, means including a liquid inlet to said storage tank for supplying condensate from said flash tank under relatively high pressure and relatively high temperature conditions, whereby a first portion of the thus supplied condensate is flashed into the gas phase substantially at atmospheric pressure in said chamber and a second portion of the thus supplied condensate is correspondingly cooled to said relatively low temperature condition to provide cooled liquefied product below said floating roof, and a liquid outlet in the lower portion of said storage tank for withdrawing therefrom liquefied product.

2. The storage system set forth in claim 1, wherein the periphery of said deck is spaced from said tank side wall to provide a space therebetween to permit passage of gas product from beneath said floating roof into said chamber.

3. A system for storing in the liquid phase a product that is characterized by being entirely in the gas phase under atmospheric pressure and ambient temperature conditions, the system comprising an upstanding storage tank adapted to contain a body of the product in the liquid phase under substantially atmospheric pressure and relatively low temperature conditions, said storage tank including a bottom wall and an upstanding side wall and a top wall, said bottom wall closing the lower end of said side wall and said top wall closing the upper end of said side wall to form a hermetically sealed storage tank, said bottom wall and said side wall being heat-insulated, an upstanding tube arranged in said storage tank, said tube having upper passages therein adjacent to the upper end thereof and providing communication between the interior of said tube and said storage tank, said tube having lower passages therein adjacent to the lower end thereof and providing communication between the interior of said tube and said storage tank, a floating roof disposed in said storage tank and adapted to float upon a body of the product in the liquid phase and cooperating with said top wall to define a chamber therebetween, said floating roof including an annular deck arranged generally horizontally between said tank side wall and said tube, an annular guide mounted on said deck adjacent to said tube, a quantity of heat-insulating material mounted on said deck to provide insulation between the lower side of said floating roof and the upper side thereof, a flash tank, means including a gas outlet for withdrawing from said chamber the gaseous product evolved from the contained body of liquefied product and for compressing said gaseous product and for delivering said product to said flash tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, means including a liquid inlet for supplying into the upper end of said tube condensate from said flash tank under relatively high pressure and relatively high temperature conditions, whereby a first portion of the thus supplied condensate is flashed into the gas phase substantially at atmospheric pressure and escapes from said tube through said open passages into said chamber and a second portion of the thus supplied condensate is correspondingly cooled to said relatively low temperature condition to provide cooled liquefied product that falls downwardly through said tube, and a liquid outlet in the lower portion of said storage tank for withdrawing therefrom liquefied product.

4. The storage system set forth in claim 3, wherein said upstanding tube is arranged generally in the central portion of said storage tank, both said upper passages and said lower passages are disposed in circumferentially spaced-apart relation and are directed generally radially outwardly from said tube.

5. The storage system set forth in claim 3, wherein the lower end of said tube extends downwardly to said bottom wall and is mounted thereon and is closed, and the upper end of said tube extends upwardly to said top wall and is mounted thereon and is closed.

6. The storage system set forth in claim 3, wherein said fender is spaced from said storage tank wall to provide a passage therebetween for gaseous product from below said floating roof to said chamber, and said guide is spaced from said tube to provide a passage therebetween for gaseous product from below said floating roof to said chamber.

7. The storage system set forth in claim 3, and further comprising a second liquid inlet for the addition of liquefied product to the interior of said tube.

8. The storage system set forth in claim 3, wherein said gas outlet communicates with the interior of said tube above said liquid inlet.

9. A tank for storing in the liquid phase under substantially atmospheric pressure and relatively low temperature conditions a body of a product that is characterized by being entirely in the gas phase under atmospheric pressure and ambient condition, said storage tank comprising a bottom wall and an upstanding side wall and a top wall, said bottom wall closing the lower end of said side wall and said top wall closing the upper end of said side wall to form a hermetically sealed tank, said bottom wall and said side wall being heat-insulated, a floating roof disposed in said tank and adapted to float upon a body of the product in the liquid phase and cooperating with said top wall to define a chamber therebetween, said floating roof including an annular deck arranged generally horizontally within said tank side wall, guide structure mounted on said tank extending upwardly through said floating roof, an annular guide mounted on said deck adjacent to said guide structure for cooperating therewith to stabilize the movements of said floating roof within said tank, a quantity of heat-insulating material mounted on said deck to provide insulation between the lower side of said floating roof and the upper side thereof, means for withdrawing from said chamber the gaseous products evolved from the contained body of liquefied product, a liquid inlet to said tank for adding thereto liquefied product, and a liquid outlet in the lower portion of said tank for withdrawing therefrom liquefied product.

10. The storage tank set forth in claim 9, wherein the periphery of said deck is spaced from said tank side wall to provide a passage therebetween to permit passage of gaseous product from beneath said floating roof into said chamber.

11. A tank for storing in the liquid phase under substantially atmospheric pressure and relatively low temperature conditions a body of a product that is characterized by being entirely in the gas phase under atmospheric pressure and ambient temperature conditions, said storage tank comprising a bottom wall and an upstanding side wall and a top wall, said bottom wall closing the lower end of said side wall and said top wall closing the upper end of said side wall to form a hermetically sealed tank, said bottom wall and said side wall being heat-insulated, an upstanding tube arranged in said storage tank generally centrally thereof, said tube having upper passages therein adjacent to the upper end thereof and providing communication between the interior of said tube and said tank, said tube having lower passages therein adjacent to the lower end thereof and providing communication between the interior of said tube and said tank, a floating roof disposed in said tank and adapted to float upon a body of the product in the liquid phase and cooperating with said top wall to define a chamber therebetween, said floating roof including an annular deck arranged generally horizontally between said tank side wall and said tube, an annular guide mounted on said deck adjacent to said tube, a quantity of heat-insulating material mounted on said deck to provide insulation between the lower side of said floating roof and the upper side thereof, a gas outlet for withstanding from said chamber the gaseous product evolved from the contained body of liquid product, a liquid inlet for supplying into said tube liquefied product, and a liquid outlet in the lower portion of said tank for withdrawing therefrom liquefied product.

12. The storage tank set forth in claim 11, wherein the lower end of said tube extends downwardly to said bottom wall and is mounted thereon and is closed, and the upper end of said tube extends upwardly to said top wall and is mounted thereon and is closed.

13. The storage tank set forth in claim 11, wherein the periphery of said deck is spaced from said tank wall to provide a passage therebetween for gaseous product from below said floating roof to said chamber, and said guide is spaced from said tube to provide a passage therebetween for gaseous product from below said floating roof to said chamber.

14. The storage tank set forth in claim 11, wherein said gas outlet communicates with the interior of said tube above said liquid inlet.

15. The storage tank set forth in claim 11, and further comprising a liquid return inlet for supplying into said tube returned liquefied product, said gas outlet also communicating with the interior of said tube and being disposed above both said liquid inlet and said liquid return inlet.

16. The storage system set forth in claim 3 and further comprising a fender mounted on the outer periphery of said deck and disposed adjacent to said tank wall.

17. The storage tank set forth in claim 11 and further comprising a fender mounted on the outer periphery of said deck and disposed adjacent to said tank wall.

18. A system for storing in the liquid phase a product that is characterized by being entirely in the gas phase under atmospheric pressure and ambient temperature conditions, said system comprising an upstanding storage tank adapted to contain a body of the product in the liquid phase under substantially atmospheric pressure and relatively low temperature conditions, said storage tank including a bottom wall and an upstanding side wall and a top wall, said bottom wall closing the lower end of said side wall and said top wall closing the upper end of said side wall to form a hermetically sealed storage tank, said bottom wall and said side wall being heat-insulated, a floating roof disposed in said storage tank and adapted to float upon a body of the product in the liquid phase and cooperating with said top wall to define a chamber therebetween, said floating roof including an annular deck arranged generally horizontally within said tank side wall, guide structure mounted on said storage tank and extending upwardly through said floating roof, an annular guide mounted on said deck adjacent to said guide structure for cooperation therewith to stabilize the movements of said floating roof within said storage tank, a quantity of heat-insulating material mounted on said deck to provide insulation between the lower side of said floating roof and the upper side thereof, a flash tank, means including a gas outlet for withdrawing from said chamber the gaseous product evolved from the contained body of liquefied product and for compressing said gaseous product and for delivering said product to said flash tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, means including a liquid inlet to said storage tank for supplying condensate from said flash tank under relatively high pressure and relatively high temperature conditions, whereby a first portion of the thus supplied condensate is flashed into the gas phase substantially at atmospheric pressure in said chamber and a second portion of thus supplied condensate is correspondingly cooled to said relatively low temperature condition to provide cooled liquefied prduct below said floating roof, and a liquid outlet in the lower portion of said storage tank for withdrawing therefrom liquefied product.

19. A tank for storing in the liquid phase under substantially atmospheric pressure and relatively low temperature conditions a body of a product that is characterized by being entirely in the gas phase under atmospheric pressure and ambient condition, said storage tank comprising a bottom wall an an upstanding side wall and a top wall, said bottom wall closing the lower end of said side wall and said top wall closing the upper end of said side wall to form a hermetically sealed tank, said bottom wall and said side wall being heat insulated, a floating roof disposed in said tank and adapted to float upon a body of the product in the liquid phase and cooperating with said top wall to define a chamber therebetween, said floating roof including an annular deck arranged generally horizontally within said tank side wall, guide structure mounted on said tank extending upwardly through said floating roof, an annular guide mounted on said deck adjacent to said guide structure for cooperating therewith to stabilize the movements of said floating roof within said tank, a quantity of heat-insulating material mounted on said deck to provide insulation between the lower side of said floating roof and the upper side thereof, means for withdrawing from said chamber the gaseous products evolved from the contained body of liquefied product, a liquid inlet to said tank for adding thereto liquefied product, said liquid inlet being positioned above said floating roof thereby to admit liquid to said tank above said floating roof to flow downwardly thereby to be added to the liquefied product, and a liquid outlet in the lower portion of said tank for withdrawing therefrom liquefied product.

References Cited

UNITED STATES PATENTS

| | | |
|---|---|---|
| 1,631,959 | 6/1927 | Glass. |
| 3,419,174 | 12/1968 | Engoahl. |
| 2,550,886 | 5/1951 | Thompson _____ 220—85 XR |
| 3,251,191 | 5/1966 | Reed _____ 62—45 |
| 3,254,498 | 6/1966 | Becker _____ 62—45 |
| 3,276,213 | 10/1966 | Soesan _____ 62—45 |
| 3,280,575 | 10/1966 | Drake _____ 62—45 X |

RAPHAEL H. SCHWARTZ, Primary Examiner

U.S. Cl. X.R.

62—45